US008670795B2

(12) United States Patent
Sakata et al.

(10) Patent No.: US 8,670,795 B2
(45) Date of Patent: Mar. 11, 2014

(54) TRANSMISSION POWER CONTROL METHOD, WIRELESS COMMUNICATION SYSTEM AND TERMINAL APPARATUS (75) Inventors: Masayuki Sakata, Tokyo (JP); Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 327 days.

(21) Appl. No.: 13/254,332

(22) PCT Filed: Mar. 15, 2010

(86) PCT No.: PCT/JP2010/054747
§ 371 (c)(1),
(2), (4) Date: Sep. 1, 2011

(87) PCT Pub. No.: WO2010/110185
PCT Pub. Date: Sep. 30, 2010

(65) Prior Publication Data
US 2012/0004008 A1 Jan. 5, 2012

(30) Foreign Application Priority Data
Mar. 24, 2009 (JP) .................................. 2009-071615

(51) Int. Cl.
*H04B 7/00* (2006.01)

(52) U.S. Cl.
USPC ................................ 455/522; 455/68; 455/69

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| 7,319,883 | B2 * | 1/2008 | Brusch et al. .................. 455/522 |
| 2001/0016499 | A1 * | 8/2001 | Hamabe ......................... 455/454 |
| 2004/0229570 | A1 * | 11/2004 | Matsumura ................. 455/67.11 |
| 2005/0282574 | A1 * | 12/2005 | Li et al. ........................... 455/522 |
| 2006/0111137 | A1 * | 5/2006 | Mori et al. ..................... 455/522 |
| 2006/0116154 | A1 * | 6/2006 | Han ............................... 455/522 |
| 2006/0128318 | A1 * | 6/2006 | Agarossi et al. ................ 455/69 |
| 2006/0215611 | A1 * | 9/2006 | Nakagawa et al. ............ 370/332 |
| 2007/0010269 | A1 * | 1/2007 | Azuma .......................... 455/512 |
| 2007/0259681 | A1 * | 11/2007 | Cheng et al. .................. 455/522 |
| 2009/0170547 | A1 * | 7/2009 | Raghothaman et al. ....... 455/522 |

(Continued)

FOREIGN PATENT DOCUMENTS

JP 6-152494 A 5/1994
JP 2003203292 A 7/2003

(Continued)

OTHER PUBLICATIONS

International Search Report for PCT/JP2010/054747 mailed Jun. 22, 2010.

*Primary Examiner* — Dominic E Rego
(74) *Attorney, Agent, or Firm* — Sughrue Mion, PLLC (57) ABSTRACT A transmission power control method, a wireless communication system and a terminal apparatus which can reduce radio interference to each terminal apparatus installed into peripheral cars other than the communication counterpart are provided. In wireless communication between at least two movable terminal apparatuses, a terminal apparatus which has received a predetermined wireless signal transmitted with a known electric power from another terminal apparatus measures its received power and sets a numerical value of transmission power when transmitting information to the other terminal apparatus according to the measured value of the received power.

10 Claims, 5 Drawing Sheets

(56) References Cited

U.S. PATENT DOCUMENTS

| | | | |
|---|---|---|---|
| 2009/0196223 A1* | 8/2009 | Nalbantis et al. | 370/328 |
| 2009/0325623 A1* | 12/2009 | Morita et al. | 455/522 |
| 2012/0046055 A1* | 2/2012 | Carter et al. | 455/501 |

FOREIGN PATENT DOCUMENTS

| | | |
|---|---|---|
| JP | 2004533762 A | 11/2004 |
| JP | 2006262212 A | 9/2006 |
| JP | 2008507884 A | 3/2008 |

* cited by examiner

TRANSMISSION POWER CONTROL METHOD, WIRELESS COMMUNICATION SYSTEM AND TERMINAL APPARATUS

TECHNICAL FIELD

The present invention relates to a transmission power control method in wireless communication and a wireless communication system using the transmission power control method, and particularly relates to a transmission power control method suitable for wireless communication between two cars, and a wireless communication system and a terminal apparatus using the transmission power control method.

BACKGROUND ART

In ITS (Intelligent Transport Systems), systems for providing information which is useful for avoidance of an accident such as early detection of an oncoming car on a road of poor visibility and advance notification of an incoming car to an impenetrable intersection are being investigated. Also in ITS, service for providing various kinds of information useful at the time of transfer such as traffic guidance and congestion information is also being investigated. As a means for realizing such system, there has been a proposal of structure in which a terminal apparatus capable of wireless communication into each car is installed, for sending and receiving various kinds of information by the terminal apparatus. A terminal apparatus for short-range communication (DSRC: Dedicated Short-Range Communication) used in ITS is disclosed in patent document 1, for example.

In ITS, when various kinds of information are sent and received (usually, by packet communication) between the terminal apparatuses installed into respective cars, information is transmitted by relatively large constant electric power so that communication may be possible even for a car located at an edge of a target communication area. Here, a target communication area, which is specified in ITS, indicates an area (a distance) in which wireless communication under a within-the-horizon condition (within-the-horizon communication) is possible and an area (a distance) in which wireless communication under a beyond-the-horizon condition (beyond-the-horizon communication) is possible.

Meanwhile, an electric power control method for controlling transmission power of a mobile station in a wireless LAN system is described, for example in patent document 2 or patent document 3, although that has not been applied to ITS.

RELATED ART DOCUMENTS

Patent Documents

Patent document 1: Japanese Patent Application Laid-Open No. 2003-203292
Patent document 2: Japanese Patent Application Laid-Open No. 2006-262212
Patent document 3: Published Japanese translation of PCT application No. 2004-533762

DISCLOSURE OF INVENTION

Problems to be Solved by the Invention

In the technologies described above, a terminal apparatus for ITS transmits various kinds of information by relatively large fixed electric power so that communication may be possible even with a car located at an edge of a target communication area. Further, in an existing terminal apparatus for ITS, directivity control to transmit a radio wave toward a communication counterpart is not carried out.

Accordingly, a wireless signal transmitted from a car to a communication counterpart car will be a radio interference source to each terminal apparatus installed into peripheral cars other than the communication counterpart's car. As a result, there is a problem that the communication quality in each terminal apparatus installed into peripheral cars is degraded.

The present invention has been made in order to solve the above-mentioned problem which the related technologies have, and an object of it is to provide a transmission power control method, a wireless communication system and a terminal apparatus which can reduce radio interference to each terminal apparatus installed into peripheral cars other than the communication counterpart.

Technical Solution

In order to achieve the object, a transmission power control method of the present invention is a transmission power control method for controlling transmission power with which information is transmitted from one terminal apparatus to other terminal apparatuses in wireless communication between at least two movable terminal apparatuses, includes setting a transmission power value Ptx for transmitting the information to one of the other terminal apparatuses as $Ptx \geq Poffset - Prx$, given that a measured value of received power at one terminal apparatus concerning a predetermined wireless signal transmitted with known electric power from one of the other terminal apparatuses is Prx, and a value of a maximum transmission power which is set in advance and used for wireless communication between the terminal apparatuses in a predetermined communication area is Poffset.

And a wireless communication system of the present invention is a wireless communication system making wireless communication between at least two removable terminal apparatuses possible, and a transmission power value Ptx for transmitting information to one of other terminal apparatuses is set as $Ptx \geq Poffset - Prx3$, given that a measured value of received power at one terminal apparatus concerning a predetermined wireless signal transmitted with known electric power from one of the other terminal apparatuses is Prx, and a value of a maximum transmission power which is set in advance and used for wireless communication between the terminal apparatuses in a predetermined communication area is Poffset.

And a movable terminal apparatus of the present invention is a movable terminal apparatus capable of wireless communication with a movable peripheral terminal apparatus, includes a reception processing means for measuring received power concerning a predetermined wireless signal transmitted with known electric power from the peripheral terminal apparatus, and a transmission power control means for setting a transmission power value Ptx for transmitting information to the peripheral terminal apparatus as $Ptx \geq Poffset - Prx$, given that a measured value of the received power measured by the reception processing means is Prx, and a value of a maximum transmission power used for wireless communication between the terminal apparatuses in a predetermined communication area is Poffset.

Effect of the Invention

According to the present invention, radio interference to each terminal apparatus installed into peripheral cars other than the communication counterpart can be reduced.

BEST MODE FOR CARRYING OUT THE INVENTION

Next, the present invention will be described using the drawings.

THE FIRST EMBODIMENT

Figure 1:
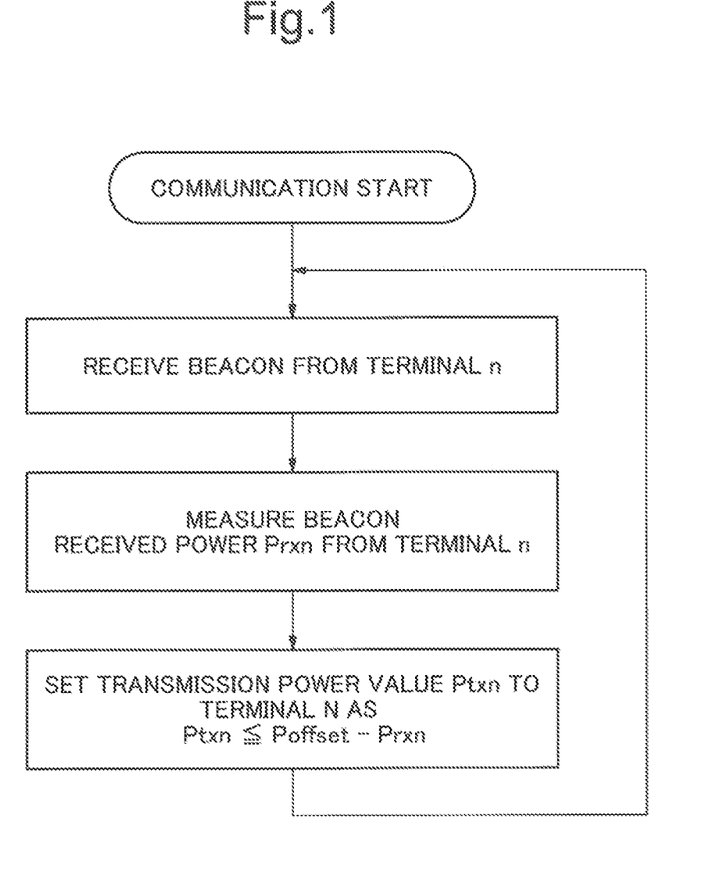
FIG. 1 is a flow chart showing a processing procedure of a terminal apparatus provided in a wireless communication system of a first exemplary embodiment.

As one embodiment of the present invention, FIG. 1 indicates a flow chart showing a transmission power setting processing procedure in wireless communication of a terminal apparatus. Here, explanation will be made using an example in which a terminal apparatus 1 among at least two movable terminal apparatuses 1, 2, . . . in a communication area is receiving a wireless signal from another terminal apparatus n (n is a positive integer).

As shown in FIG. 1, when a wireless signal is received from the terminal apparatus n and if the received wireless signal is a beacon, the terminal apparatus 1 of this exemplary embodiment measures received power Prxn of the beacon.

Next, the terminal apparatus 1 sets transmission power Ptxn of a wireless signal when transmitting information to the terminal apparatus n to a numerical value Poffset−Prxn or more. Here, Poffset is a numerical value set in advance, and is made by adding electric power Pmargin which is enough for a terminal apparatus of a communication counterpart to be possible of receiving a packet to transmission power Ptx decided according to the size of the target communication area. This will be a numerical value of the maximum transmission power used by wireless communication with peripheral terminal apparatuses in the target communication area (constant electric power). It is supposed that the units of all of the power values Ptxn, Prxn, Poffset and Pmargin are expressed in dBm.

A beacon is a signal transmitted with known transmission power Ptx, and when the terminal apparatus 1 transmits information by the above-mentioned transmission power Ptxn to the terminal apparatus n, the terminal apparatus n can receive the information by received power corresponding to Pmargin. Accordingly, transmission power to the terminal apparatus 11 can be reduced from a numerical value of Poffset according to the numerical value of the received power of the beacon.

As above, according to an electric power control method of this exemplary embodiment, because transmission power for information transmitted from each terminal apparatus can be reduced, radio interference to each terminal apparatus installed into peripheral cars other than the communication counterpart can be reduced. Due to reduction of transmission power of a terminal apparatus which transmits information, the power consumption of the terminal apparatus is also reduced.

THE SECOND EMBODIMENT

In ITS, a terminal apparatus installed into each car notifies neighboring cars of a position of its own car periodically using a beacon. This beacon is transmitted by constant electric power because it is a broadcast message that does not designate a transmission partner.

A terminal apparatus provided in a wireless communication system of this exemplary embodiment measures received power of a beacon received from each peripheral car respectively, calculates a radio wave propagation loss for each car based on the received power concerned, and stores the measured value of the received power for each car in a memory. When information is transmitted to a car of a required communication counterpart, a numerical value of received power corresponding to the car is read from the memory, and transmission power is controlled using the read numerical value.

Here, because a wireless communication system of this exemplary embodiment is applied to ITS, that is, car-to-car communication, when each car moves, the car-to-car communication environment also changes. Therefore, not by measuring the received power of a beacon received from a car of a communication counterpart only just before transmitting information, for example, but by measuring the received power of beacons transmitted in a predetermined cycle each time, a terminal apparatus updates a numerical value to be stored.

Figure 2:
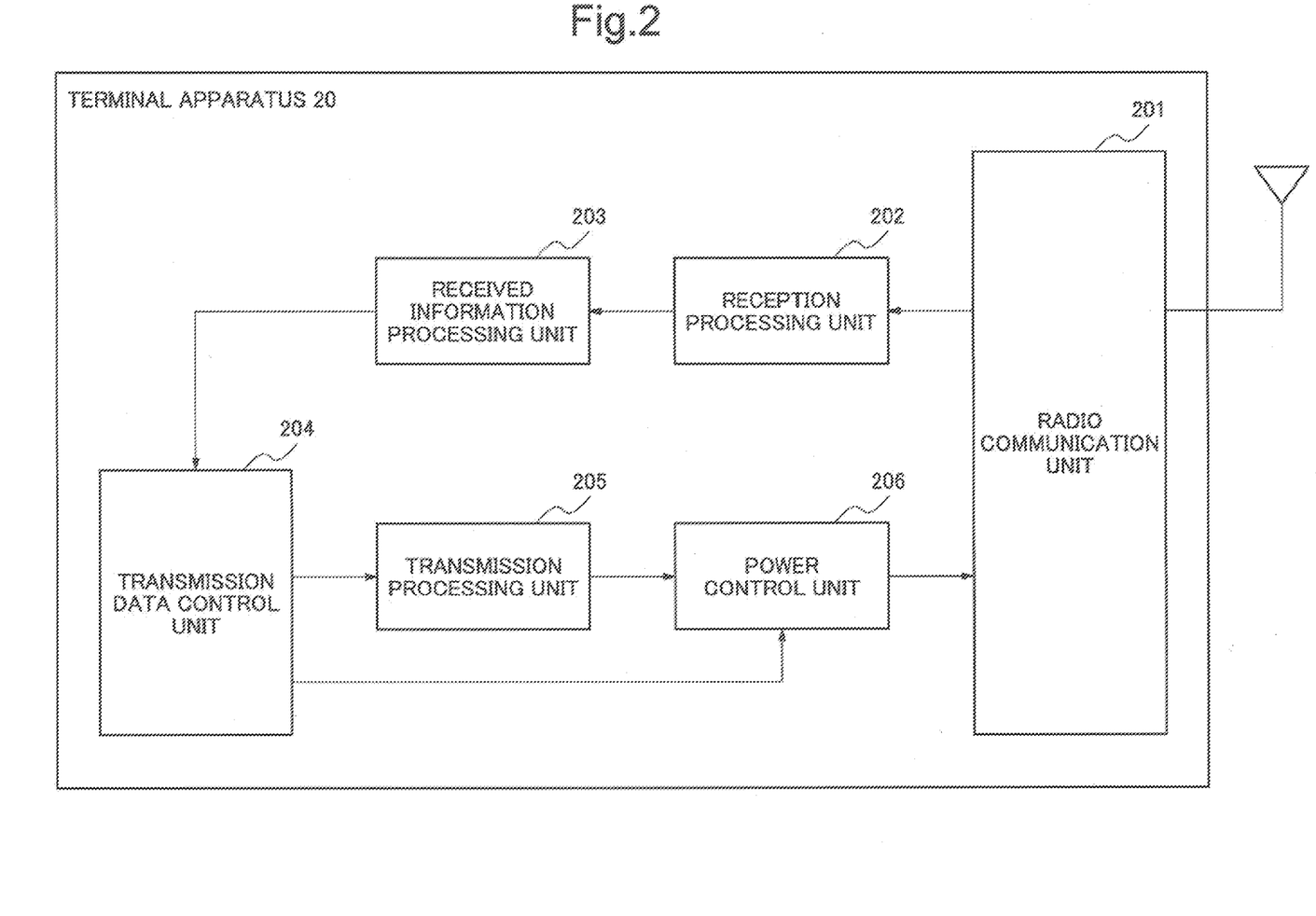
FIG. 2 is a block diagram showing an exemplary configuration of a terminal apparatus provided in a wireless communication system of a second exemplary embodiment.

FIG. 2 is a block diagram showing one exemplary configuration of a terminal apparatus provided in a wireless communication system of the second exemplary embodiment.

As shown in FIG. 2, a terminal apparatus 20 of this exemplary embodiment includes a wireless communication unit 201, a reception processing unit 202, a received information processing unit 203, a transmission data control unit 204, a transmission processing unit 205 and a power control unit 206.

The wireless communication unit 201 receives a wireless signal and outputs the received wireless signal to the reception processing unit 202. The wireless communication unit 201 also transmits a wireless signal received from the power control unit 206.

The reception processing unit 202 performs down conversion of the frequency of a wireless signal received by the wireless communication unit 201, carries out demodulation processing and decoding processing according to the wireless system and outputs the restored received data to the received information processing unit 203. When the received wireless signal is an aforementioned beacon, the reception processing unit 202 measures the received power of the beacon.

The received information processing unit 203 carries out required processing to the received data restored by the reception processing unit 202. The received information processing unit 203 calculates a radio wave propagation loss in wireless communication with a car which has transmitted the beacon from the received power of the beacon measured by the reception processing unit 202, and stores the measured value of the received power in an unillustrated memory in a manner being associated with the car which has transmitted the beacon. Every time a beacon is received from each car, the received information processing unit 203 updates a measured value of received power stored in a manner being associated with each car.

The transmission data control unit 204 determines whether there is packet communication which designates a destination or not, and outputs a signal to be transmitted by the packet concerned to the transmission processing unit 205. Packet communication designating a destination includes a case when replying to received data and a case when forwarding received data to another vehicle, for example.

The transmission data control unit 204 calculates transmission power of the packet using the numerical value of received power corresponding to the car of the destination (the communication counterpart) stored in the received information processing unit 203, and controls electric power of a wireless signal after amplification by the power control unit 206 according to the calculation result.

The transmission processing unit 205 performs up-conversion of the frequency of the signal received from the transmission data control unit 204 and carries out coding processing and modulation processing according to a predetermined wireless system. Also, it outputs the wireless signal which has been modulated to the power control unit 206.

The power control unit 206 amplifies the wireless signal received from the transmission processing unit 205 to the required electric power, and outputs it to the wireless communication unit 201. On this occasion, the power control unit 206 of this exemplary embodiment amplifies a wireless signal to electric power corresponding to a destination car following an instruction from the transmission data control unit 204.

The terminal apparatus 20 shown in FIG. 2 can be realized by well-known components such as an antenna device, a detector circuit, various amplifiers, a mixer circuit, an A/D converter, a D/A converter, a memory, a LSI including various logic circuits and the like or an information processing apparatus which executes a program, for example.

Figure 3:
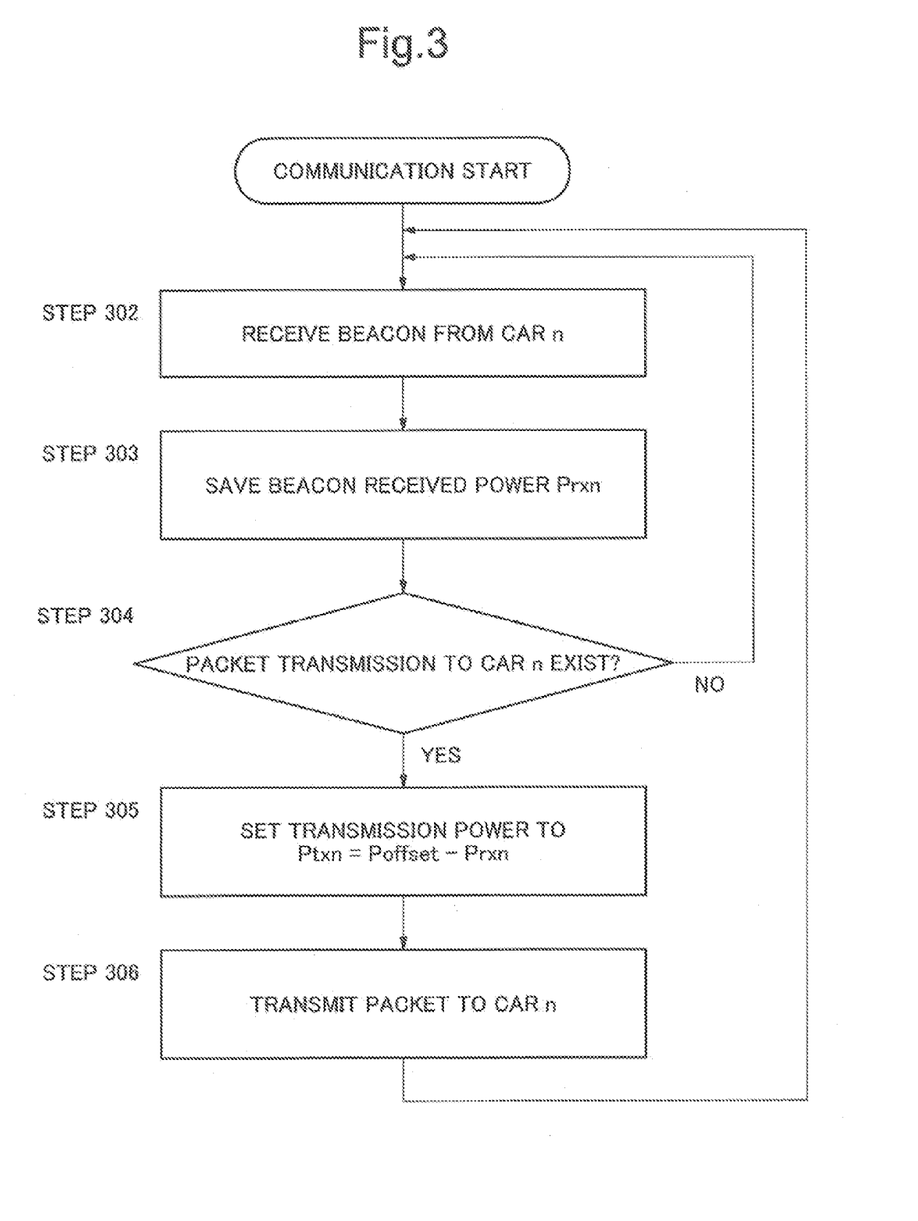
FIG. 3 is a flow chart showing a processing procedure of a terminal apparatus shown in FIG. 2.

FIG. 3 is a flow chart showing processing procedure of the terminal apparatus 20 shown in FIG. 2.

Here, description will be made taking as an example the case where a terminal apparatus installed into a certain car is received a wireless signal from a car n (n is a positive integer) located in a target notification area.

As shown in FIG. 3, when a wireless signal is received from the car n by the wireless communication unit 201, a terminal apparatus of this exemplary embodiment outputs the wireless signal to the reception processing unit 202.

When a wireless signal received from the car n is a beacon, the reception processing unit 202 measures received power Prxn of the beacon and outputs the measured value of received power Prxn to the received information processing unit 203 (Step 302).

The received information processing unit 203 calculates a radio wave propagation loss corresponding to the car n from the numerical value of received power Prxn of the beacon measured by the reception processing unit 202, and stores the numerical value of received power Prxn in a memory in a manner being associated with the car n (Step 303).

Next, the terminal apparatus confirms whether there is an information transmission (packet transmission) which takes the car n as a destination by the transmission data control unit 204 (Step 304), and when there is no packet transmission to the car n, returns to the processing of Step 302 and repeats the processing of Steps 302-304.

When there is packet transmission to the car n, the transmission data control unit 204 outputs a packet signal including information to be transmitted to the transmission processing unit 205.

The transmission processing unit 205 carries out required processing to the signal received from the transmission data control unit 204 to convert it into a wireless signal, and outputs the wireless signal to the power control unit 206 (Step 305).

The power control unit 206 amplifies the wireless signal received from the transmission processing unit 205 to required electric power following an instruction of the transmission data control unit 204, and outputs it to the wireless communication unit 201 (Step 306). In the power control unit 206, the electric power of the wireless signal is amplified so that transmission power Ptxn of the wireless signal transmitted to the car n from the wireless communication unit 201 is Poffset−Prxn. Here, Poffset is a numerical value set in advance, which has been made by adding electric power Pmargin with which the terminal apparatus of the communication counterpart is enough to be possible of receiving a packet to transmission power Ptx decided according to the size of the target communication area. This will be a numerical value (constant electric power) of the maximum transmission power used in wireless communication with peripheral terminal apparatuses in the target communication area.

In ITS, because, as mentioned above, a beacon is transmitted in constant electric power Ptx set according to the target communication area, when a packet is transmitted in transmission power Ptxn to the car n, it can be thought that the packet is received with received power Pmargin at the car n. Therefore, according to this exemplary embodiment, a packet is transmitted with transmission power of the above-mentioned Ptxn (=Poffset−Prxn) to the car n.

Figure 4:
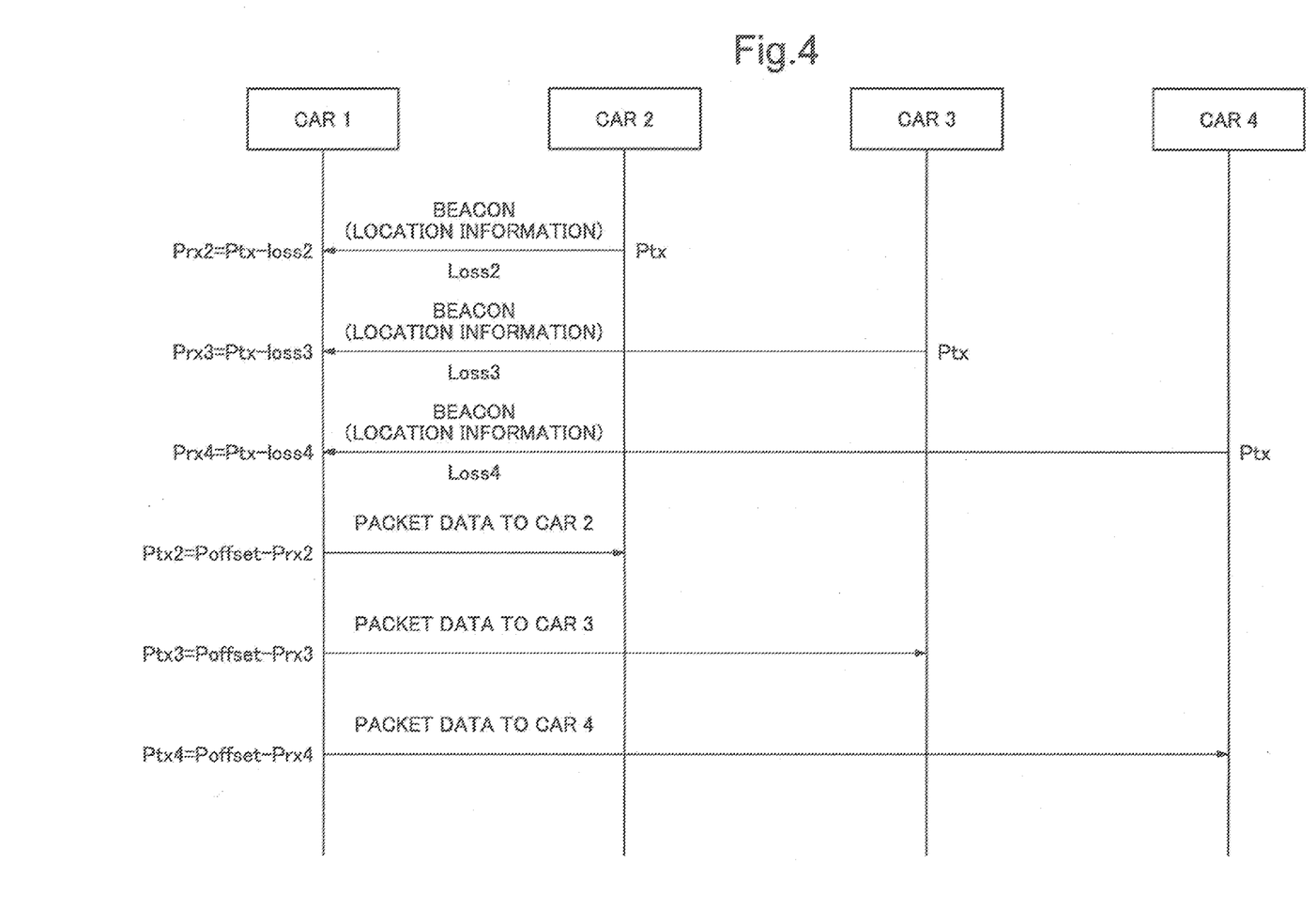
FIG. 4 is a sequence diagram showing a processing procedure of a wireless communication system of a second exemplary embodiment.

FIG. 4 is a sequence diagram showing a processing procedure of a wireless communication system of the second embodiment. FIG. 4 indicates an example of processing procedure of four cars 1-4 which exist in the target communication area. Meanwhile, processing which the cars 1-4 carry out in the following description indicates processing which a terminal apparatus installed into each car carries out.

The cars 1-4 transmit location information on their own cars acquired using GPS or the like periodically by a beacon respectively, and notify each car in the target communication area of the location information on their own cars.

As mentioned above, because a beacon is a broadcast message to which a transmission partner is not designated, it is transmitted by a constant electric power from each car. When this beacon transmission power value is represented by Ptx, and received power value of a beacon from a car 2 which a car 1 receives is expressed by Prx2, received power value of a beacon from a car 3 Prx3 and received power value of a beacon from a car 4 Prx4, the next relational expression can be obtained.

$Prx2 = Ptx - loss2$ $Prx3 = Ptx - loss3$ $Prx4 = Ptx - loss4$

Here, Ptx is transmission power of a beacon (a constant value) and is a known numerical value as mentioned above. Losses 2, 3 and 4 are radio wave propagation losses (dB) in wireless communication between the car 1 and the car 2, the car 1 and the car 3 and the car 1 and the car 4, respectively.

Whenever beacons are received from the cars 2-4, the terminal apparatus installed into the car 1 measures their received powers Prx2-4, respectively, and calculates radio wave propagation losses corresponding to cars 2-4 from those numerical values, respectively. By carrying out such processing, even if each of the cars 1-4 is moving, radio wave propagation losses corresponding to the cars 2-4 can be obtained for each transmission cycle of a beacon.

Meanwhile, in ITS, because location information is notified of from each car by a beacon, the distance between cars can be calculated. At the same time, because it is known that a radio wave propagation loss in free space is proportional to a square of a distance, if the distance between cars is found, a radio wave propagation loss can be obtained on a car-by-car basis.

However, because a radio wave propagation loss fluctuates by the peripheral structures and topography or the weather and the like, and, further; each car is moving, it is difficult to obtain a correct radio wave propagation loss between cars only by location information. Therefore, in a wireless communication system of this exemplary embodiment, a radio wave propagation loss in wireless communication with a car which has transmitted a beacon is calculated by measuring the received power of a beacon transmitted in a predetermined cycle.

When transmitting information to the cars 2-4, the car 1 determines transmission power Ptx2, Ptx3 and Ptx4 to each car from numerical values of received power Prx2 corresponding to the car 2, received power Prx3 corresponding to the car 3 and received power Prx4 corresponding to the car 4 using the following formulas, respectively.

$$Ptx2 = Poffset - Prx2$$

$$Ptx3 = Poffset - Prx3$$

$$Ptx4 = Poffset - Prx4$$

The car 1 transmits various kinds of information to the cars 2-4 by packet communication according to transmission power determined for each of the cars 2-4.

According to a wireless communication system of this exemplary embodiment, the received power of a beacon transmitted from each car with known electric power is measured, and the numerical value of received power is stored in a manner being associated with a car which has transmitted the beacon. When information (packet) is transmitted to a car which becomes a communication counterpart, transmission power is determined according to the mathematical expressions mentioned above using the numerical value of received power corresponding to the car. By this, to a car showing large beacon received power, a packet can be transmitted with electric power substantially smaller than Poffset, and, also to a car expressing small beacon received power, a packet can be transmitted with electric power smaller than Poffset. Accordingly, because the transmission power of a packet transmitted from each terminal apparatus can be made smaller than Poffset effectively according to beacon received power, radio interference to a terminal apparatus installed into a neighboring car other than the communication counterpart reduces. In addition, the power consumption of a terminal apparatus which transmits a packet is also reduced as a result of reduction of transmission power of the terminal apparatus.

THE THIRD EMBODIMENT

When a wireless communication system of the present invention is applied to ITS, that is, to car-to-car communication, it is necessary to assume that, when each car moves, the distance between cars also changes.

Because a car moving at a speed of 60 km per hour, for example, moves about 16.7 m per second, when certain two cars are moving to reverse directions with each other, the distance between the cars increases about 33.3 m a second.

As mentioned above, in a terminal apparatus of the second embodiment, by measuring received power of a beacon transmitted periodically from each car each time, a stored numerical value of received power is updated. However, when a transmission interval of a beacon is long, a packet cannot be transmitted to a communication counterpart with the most suitable electric power because the distance between the cars changes greatly within that period.

Accordingly, in a terminal apparatus of this exemplary embodiment, by the received information processing unit 203 (refer to FIG. 2), not only the measured value of the latest received power of beacon for each car but also the measured value of the received power of the beacon received just before the latest one are also stored respectively. Then, the transmission data control unit 204 calculates the difference electric power $\Delta$ between those, and corrects transmission power using the value of the difference electric power $\Delta$.

Figure 5:
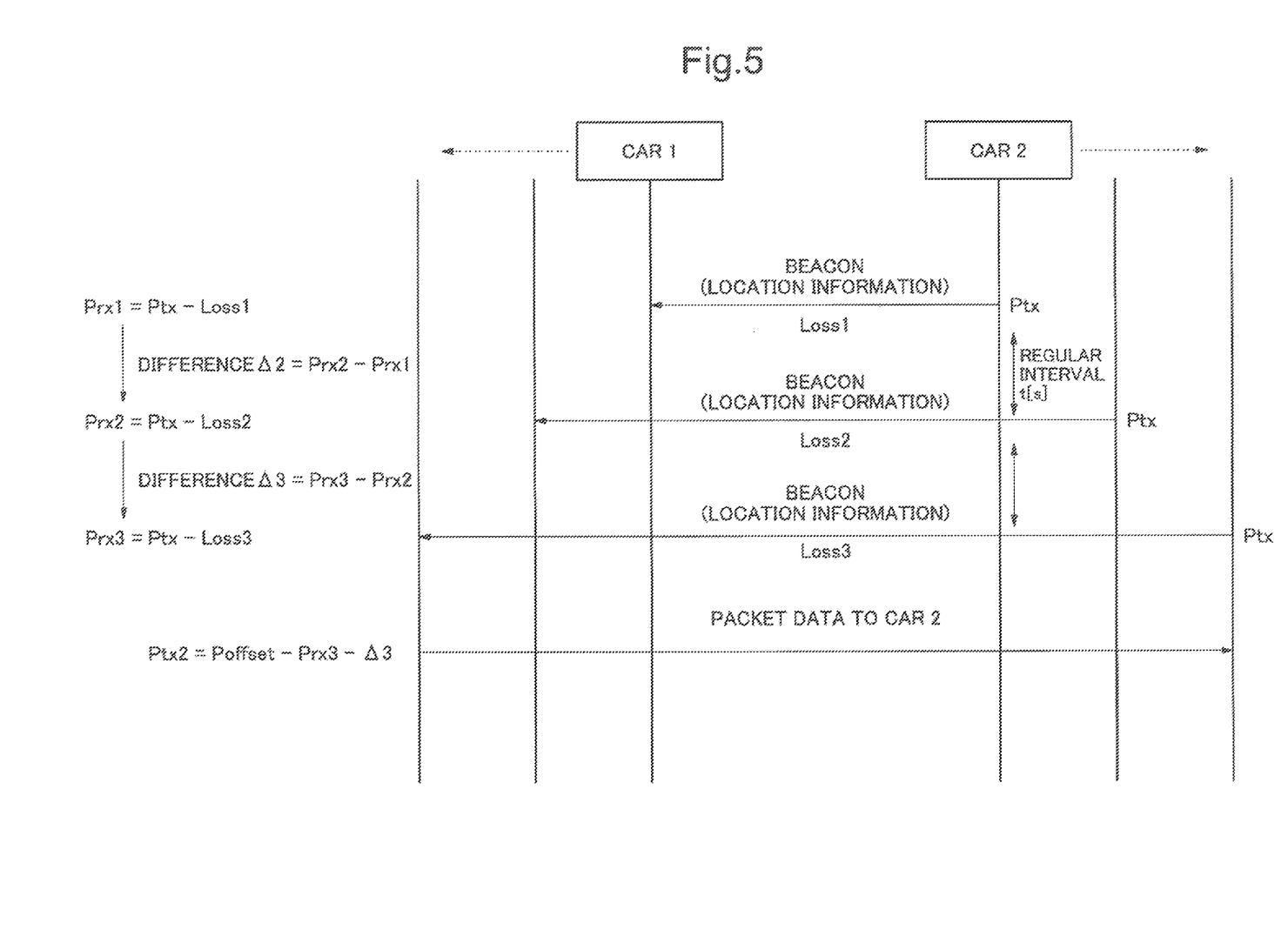
FIG. 5 is a sequence diagram showing a processing procedure of a wireless communication system of a third exemplary embodiment.

FIG. 5 is a sequence diagram showing a processing procedure of a wireless communication system of the third embodiment. FIG. 5 indicates an example of a processing procedure of a car 1 when two cars 1 and 2 exist in the target communication area.

As shown in FIG. 5, whenever a beacon is received from the car 2, the car 1 measures received power Prx1, Prx2, Prx3, ..., and calculates the difference $\Delta 2$, $\Delta 3$ and so on.

Here, Prx1, Prx2, Prx3, ... indicate pieces of received power of beacons received from the car 2 at a regular interval t in time series, and $\Delta 2$, $\Delta 3$, ... indicate a difference between current received power and received power which has been received just before the current one in time series, the difference being obtained by measuring Prx1, Prx2, Prx3, and so on.

At that time, Prx1, Prx2, Prx3, $\Delta 2$ and $\Delta 3$ can be obtained by the following formula.

$$Prx1 = Ptx - loss1$$

$$Prx2 = Ptx - loss2$$

$$Prx3 = Ptx - loss3$$

$$\Delta 2 = Prx2 - Prx1$$

$$\Delta 3 = Prx3 - Prx2$$

Loss1, loss2, loss3, ... indicate a radio wave propagation loss of beacons which the car 1 receives at a regular interval t from the car 2 in time series.

When transmitting information to the car 2 after measuring received power Prx3, the car 1 determines transmission power Ptx2 corresponding to the car 2 using the following formula.

$$Ptx2 = Poffset - Prx3 - \Delta 3$$

Because the structure of a terminal apparatus and the other processing, of the terminal apparatus are the same as that of the second embodiment, the description will be omitted.

According to a wireless communication system of this exemplary embodiment, by correcting transmission power using the difference between the received power of the last-received beacon and the received power of a beacon received just before it, a radio wave propagation loss between cars which changes due to a transmission interval of a beacon can be corrected. Therefore, a wireless communication system of the third embodiment can set transmission power of a packet to be transmitted to a car of a communication counterpart more appropriately in addition to the same effect as that of a wireless communication system of the second embodiment.

THE FOURTH EMBODIMENT

When a wireless communication system of the present invention is applied to ITS, that is, to car-to-car communication, when one communication counterpart's car has gone out of a target communication area of a car by move of each car, communication with the communication counterpart's car becomes unnecessary.

A terminal apparatus of the fourth embodiment erases the measured values of received power stored associated with a car from which a beacon has not been received for a time period set in advance among pieces of received power for each car which have been stored by the received information processing unit 203.

For example, when it has been decided that a terminal apparatus transmits a beacon at 500 ms intervals, when a beacon is not received from a certain car for 5 seconds or more after a beacon has been received from the car, the car can be determined that it has moved to outside of a target communication area. In this case, the received information processing unit 203 erases the value of received power which is stored in a memory in a manner being associated with the car.

Because the structure of a terminal apparatus and the other pieces of processing of a terminal apparatus are the same as those of the second embodiment or the third embodiment, the description will be omitted.

According to a wireless communication system of this exemplary embodiment, in addition to the same effect as a wireless communication system of the second embodiment, the memory capacity provided in the received information processing unit 203 can be reduced because it is possible to reduce the number of received power values which should be stored. Therefore, the cost of a terminal apparatus can be reduced.

THE FIFTH EMBODIMENT

A transmission power control method of the fifth embodiment of the present invention is a transmission power control method for controlling transmission power when transmitting information from one terminal apparatus to another terminal apparatus in wireless communication between at least two movable terminal apparatuses in which, when a beacon which is a wireless signal transmitted with known electric power from the other terminal apparatus is received, the one terminal apparatus measures the received power of the beacon, stores the measured value in a manner being associated with the other terminal apparatus, and every time the beacon is received from the other terminal apparatus, updates the measured value of received power which is being stored, and in which, given that the measured value of received power stored associated with the other terminal apparatus is Prx and a numerical value of transmission power set in advance needed by wireless communication between the terminal apparatuses in a predetermined communication area is Poffset, a numerical value Ptx of transmission power when transmitting the information to the other terminal apparatus is set as Ptx=Poffset−Prx.

THE SIXTH EMBODIMENT

A wireless communication system of the sixth embodiment of the present invention is a wireless communication system which makes wireless communication between at least two movable terminal apparatuses possible and which is of a structure in which, one terminal apparatus measures, when a beacon which is a wireless signal transmitted with known electric power from another terminal apparatus is received, received power of the beacon, stores the measured value in a manner being associated with the other terminal apparatus, and, every time the beacon is received from the other terminal apparatus, updates the measured value of received power which is being stored, given that the measured value of received power stored associated with the other terminal apparatus is Prxn and a numerical value of transmission power set in advance needed by wireless communication between the terminal apparatuses in a predetermined communication area is Poffset, a numerical value Ptxn of transmission power when transmitting the information to the other terminal apparatus is set as Ptxn =Poffset −Prxn.

While the invention has been particularly Shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claim's the benefit of priority from Japanese patent application No. 2009-071615, filed on Mar. 24, 2009, the disclosure of which is incorporated herein in its entirety by reference.

Industrial Applicability

Although application of the present invention to ITS has been described above, the present invention is also possible to be used in movable wireless communication terminals and the like which communicate with each other in a communication area.

DESCRIPTION OF SYMBOLS

201 Wireless communication unit
202 Reception processing unit
203 Received information processing unit
204 Transmission data control unit
205 Transmission processing unit
206 Power control unit

The invention claimed is:

1. A transmission power control method for controlling transmission power with which information is transmitted from one terminal apparatus to other terminal apparatuses in wireless communication between at least two movable terminal apparatuses, comprising:

setting a transmission power value Ptx for transmitting said information to one of said other terminal apparatuses as $Ptx \geq Poffset-Prx$, given that a measured value of received power at said one terminal apparatus concerning a predetermined wireless signal transmitted with known electric power from one of said other terminal apparatuses is Prx, and a value of a maximum transmission power which is set in advance and used for wireless communication between said terminal apparatuses in a predetermined communication area is Poffset.

2. The power control method according to claim 1, wherein said one terminal apparatus, every time it receives said predetermined wireless signal from one of said other terminal apparatuses, performs overwrite save of a measured value of its received power and calculates electric power difference Δ between a latest measured value and a value measured just before, and then, sets a transmission power value Ptx for transmitting information to said one of said other terminal apparatuses as $$Ptx \geq Poffset - Prx - \Delta,$$

given that said latest measured value is Prx.

3. The power control method according to claim 2, wherein said one terminal apparatus erases said saved measured value of received power when said predetermined wireless signal is not received newly from said one of said other terminal apparatuses even if a time set in advance has passed, after receiving said predetermined wireless signal from one of said other terminal apparatuses.

4. A wireless communication system making wireless communication between at least two removable terminal apparatuses possible, comprising:
   a unit for setting a transmission power value Ptx for transmitting information to one of other terminal apparatuses as $$Ptx \geq Poffset - Prx,$$

given that a measured value of received power at one terminal apparatus concerning a predetermined wireless signal transmitted with known electric power from one of said other terminal apparatuses is Prx, and a value of a maximum transmission power which is set in advance and used for wireless communication between said terminal apparatuses in a predetermined communication area is Poffset.

5. The wireless communication system according to claim 4, wherein
   said one terminal apparatus, every time it receives said predetermined wireless signal from one of said other terminal apparatuses, performs overwrite save of a measured value of the received power and calculates electric power difference Δbetween a latest measured value and a value measured just before, and then, sets a transmission power value Ptx for transmitting information to said one of said other terminal apparatuses as $$Ptx \geq Poffset - Prx\ \Delta,$$

given that said latest measured value is Prx.

6. The wireless communication system according to claim 5, wherein
   said one terminal apparatus erases said saved measured value of received power when said predetermined wireless signal is not received newly from said one of said other terminal apparatuses even if a time set in advance has passed, after receiving said predetermined wireless signal from one of said other terminal apparatuses.

7. A movable terminal apparatus capable of wireless communication with a movable peripheral terminal apparatus, comprising:
   a reception processing unit for measuring received power concerning a predetermined wireless signal transmitted with known electric power from said peripheral terminal apparatus; and
   a transmission power control unit for setting a transmission power value Ptx for transmitting information to said peripheral terminal apparatus as $$Ptx \geq Poffset - Prx,$$

given that a measured value of said received power measured by said reception processing unit is Prx, and a value of a maximum transmission power used for wireless communication between said terminal apparatuses in a predetermined communication area is Poffset.

8. The terminal apparatus according to claim 7, further comprising:
   a received information processing unit for performing overwrite save of a measured value of the received power, every time said predetermined wireless signal is received from one of said other terminal apparatuses, wherein
   said transmission power control unit calculates electric power difference Δbetween a latest measured value and a value measured just before, about received power concerning said predetermined wireless signal from said one of said other terminal apparatuses, and, sets a value Ptx of transmission power for transmitting information to said one of said other terminal apparatuses as $$Ptx \geq Poffset - Prx - \Delta,$$

given that said latest measured value is Prx.

9. The terminal apparatus according to claim 8, wherein
   said received information processing unit erases said saved measured value of received power when said predetermined wireless signal is not received newly from said one of said other terminal apparatuses even if a time set in advance has passed, after receiving said predetermined wireless signal from one of said other terminal apparatuses.

10. A movable terminal apparatus capable of wireless communication with a movable peripheral terminal apparatus, comprising:
    a reception processing means for measuring received power concerning a predetermined wireless signal transmitted with known electric power from said peripheral terminal apparatus; and
    a transmission power control means for setting a transmission power value Ptx for transmitting information to said peripheral terminal apparatus as $$Ptx \geq Poffset - Prx,$$

given that a measured value of said received power measured by said reception processing means is Prx, and a value of a maximum transmission power used for wireless communication between said terminal apparatuses in a predetermined communication area is Poffset.

* * * * *